(12) United States Patent
Katayama et al.

(10) Patent No.: US 7,600,240 B2
(45) Date of Patent: Oct. 6, 2009

(54) DATA PROCESSING APPARATUS AND METHOD

(75) Inventors: Hiroshi Katayama, Chiba (JP); Hiroshi Yamaguchi, Chiba (JP); Hirofumi Yuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 669 days.

(21) Appl. No.: 11/274,542

(22) Filed: Nov. 15, 2005

(65) Prior Publication Data

US 2006/0123458 A1 Jun. 8, 2006

(30) Foreign Application Priority Data

Nov. 17, 2004 (JP) ............... 2004-333322

(51) Int. Cl.
*H04N 5/445* (2006.01)
*H04N 7/173* (2006.01)
(52) U.S. Cl. .................... 725/38; 725/125
(58) Field of Classification Search ........... 725/38, 725/125
See application file for complete search history.

(56) References Cited

U.S. PATENT DOCUMENTS 6,005,597 A * 12/1999 Barrett et al. .......... 725/46
6,393,198 B1 * 5/2002 LaMacchia ........... 386/54
6,516,005 B1 * 2/2003 Murayama et al. ....... 370/503
2005/0060753 A1 * 3/2005 Lundblad et al. ......... 725/100

FOREIGN PATENT DOCUMENTS

| JP | 7 177479 | 7/1995 |
|---|---|---|
| JP | 8 186553 | 7/1996 |
| JP | 9 205618 | 8/1997 |
| JP | 2001 136456 | 5/2001 |
| JP | 2002 176643 | 6/2002 |

* cited by examiner

*Primary Examiner*—Christopher Kelley
*Assistant Examiner*—Franklin S Andramuno
(74) *Attorney, Agent, or Firm*—Frommer Lawrence & Haug LLP; William S. Frommer; Thomas F. Presson

(57) ABSTRACT

Video presentation timing can match sounding timing with high accuracy. A digital broadcast receiver calculates the presentation delay time dt from the presentation time when video based on the compressed video data is to be presented to the time when the video is presented on the presentation unit, and outputs audio based on the compressed audio data when the calculated presentation delay time dt passes from the sounding time when the audio based on the compressed audio data is to be outputted.

3 Claims, 5 Drawing Sheets

DATA PROCESSING APPARATUS AND METHOD

CROSS REFERENCES TO RELATED APPLICATIONS

The present invention contains subject matter related to Japanese Patent Application JP2004-333322 filed in the Japanese Patent Office on Nov. 17, 2004, the entire contents of which being incorporated herein by reference.

BACKGROUND OF THE INVENTION

1. Field of the Invention

The present invention relates to a data processing apparatus and a method for use with the apparatus, and is preferably applied to a decoding device which outputs video and audio by decoding compressed video data and compressed audio data encoded according to, for example, the Moving Picture Experts Group Layer 2 (MPEG2) system, etc.

2. Description of the Related Art

Recently, a digital broadcast receiver has become widespread as a decoding device of the above-mentioned type. The digital broadcast receiver is configured to output video and audio according to a procedure RT1X as shown in FIG. 1 when, for example, a user performs a channel switching operation.

That is, the digital broadcast receiver passes control to step SP1 when a user performs a channel switching operation, and receives a Network Information Table (NIT). The NIT contains physical information about a transmission line (in this case, an orbit of a satellite, a polarized wave, a frequency for each transponder, etc.). Thus, the digital broadcast receiver can select a transponder corresponding to a request channel requested in the channel switching operation based on the NIT, and as a result receive a transport stream corresponding to the request channel.

Then, the digital broadcast receiver passes control to step SP2, and receives a Program Association Table (PAT). The digital broadcast receiver then passes control to step SP3, and receives a Program Map Table (PMT) corresponding to the request channel based on the PAT.

Then, the digital broadcast receiver passes control to step SP4, and realizes a Program Identification (PID) corresponding to the request channel based on such PMT. In this case, the PID corresponds to the identification information for identifying a packet containing the compressed video data, compressed audio data, Program Clock Reference (PCR) data, etc. corresponding to the request channel. The digital broadcast receiver can obtain the compressed video data, compressed audio data, PCR data, etc. corresponding to the request channel as a stream by separating a packet corresponding to the recognized PID from a received transport stream.

The processes in step SP1 to SP4 described above are well known as a DEMUX process (refer to Japanese Patent Application JP2003-274304).

The obtained PCR data in the stream includes the system time clock at an encoding device which encodes the compressed video data and the compressed audio data.

Therefore, when the digital broadcast receiver passes control to the next step SP5, it sets the System Time Clock (STC) kept in the digital broadcast receiver to the time clock kept in the PCR data. Thus, the system time clock kept by the digital broadcast receiver can be synchronized with the time clock kept at the encoding device.

Also in the stream, as shown in FIG. 2, the Presentation Time Stamp (PTS) indicating the time when the video is to be presented is associated with each piece of video data "Dpic (0)", "Dpic (1)", . . . corresponding to one frame for example. Likewise, in the stream, the sounding time stamp (PTS) indicating the time when the audio is to be outputted is associated with each piece of compressed audio data "Dframe (0)", "Dframe (1)", . . . corresponding to one frame for example.

Thus, the digital broadcast receiver passes control to step SP6, for example, when the kept system time clock matches the presentation time stamp "pts (0)" associated with the compressed video data "Dpic (0)", and presents on the presentation device the video "Vpic (0)" based on the video data obtained by decoding the compressed video data "Dpic (0)".

In addition, the digital broadcast receiver passes control to step SP7 when the kept system time clock matches the sounding time stamp "pts (0)" associated with the compressed audio data "Dframe (0)", and outputs the audio "Sframe (0)" based on the audio data obtained by decoding the compressed audio data "Dframe (0)" through a speaker, etc.

Thus, the digital broadcast receiver can allow to some extent the video presentation timing indicating the video "Vpic (0)", . . . to match the sounding time outputting the audio "Sframe (0)", . . . corresponding to the video "Vpic (0)".

SUMMARY OF THE INVENTION

The above-mentioned digital broadcast receiver practically generates a vertical synchronizing signal for synchronization in the operation of a scanning line in the vertical direction for use in presenting video on the presentation device, and sequentially presents the video "Vpic (0)", . . . in synchronization with the generated signal.

Therefore, in the case as shown in FIG. 2, for example, relating to the audio "Sframe (0)", although the audio "Sframe (0)" can be output at the sounding time "pts (0)" when the audio is to be outputted as scheduled, the video "Vpic (0)" corresponding to the audio "Sframe (0)" is not assigned the vertical synchronizing signal generated at the presentation time "pts (0)" when the video "Vpic (0)" based on the video data is to be presented. Therefore, the video "Vpic (0)" is not allowed to be presented, and the video "Vpic (0)" can be presented when a vertical synchronizing signal is subsequently generated.

As a result, in the digital broadcast receiver, a difference of a maximum of ±½ frame is detected between the sounding timing of the audio "Sframe (0)", . . . and the video presentation timing of the video "Vpic (0)", . . . corresponding to the audio "Sframe (0)", . . . . Therefore, it is hard to recognize the video presentation timing as matching the sounding timing with high accuracy.

A method for solving the above-mentioned problem can be adjusting the vertical synchronizing signal generated in the digital broadcast receiver to match the presentation time stamp before presenting the video "Vpic (0)", . . . . However, when the adjustment is made, the vertical synchronizing signal causes a disturbance, thereby causing the video "Vpic (0)", . . . presented a disturbance. As a result, the method is not preferable.

The present invention has been developed to solve the above-mentioned problems, and provides a data processing apparatus and method capable of making video presentation timing matching sounding timing with high accuracy.

To solve the problem, a data processing apparatus according to the present invention includes: a presentation device for presenting video based on video data when a video presentation timing signal is provided from a providing device for providing a video presentation timing signal indicating presentation timing for video at a predetermined cycle time after a presentation time when video based on the video data is to be presented; a calculation device for calculating a presentation delay time from the presentation time when video based on the video data is to be presented to a time when the presentation device presents the video; and a sounding device for outputting audio based on audio data when the calculated presentation delay time passes from a sounding time when audio based on the audio data is to be outputted.

Thus, with the data processing apparatus, the presentation delay time from the presentation time when video based on the video data is to be presented to the presentation of the video by the presentation device is calculated. When the calculated presentation delay time passes from the sounding time when audio based on the audio data is to be outputted, the audio based on the audio data is output, thereby delaying the output of the audio by the delay the presentation of the video, and successfully avoiding the shift between the video presentation timing to present the video and the sounding timing to output the audio.

According to the present invention, the presentation delay time from the presentation time when video based on the video data is to be presented to the presentation of the video by the presentation device is calculated. When the calculated presentation delay time passes from the sounding time when audio based on the audio data is to be outputted, the audio based on the audio data is output, thereby delaying the output of the audio by the delay the presentation of the video, and successfully avoiding the shift between the video presentation timing to present the video and the sounding timing to output the audio. Accordingly, the data processing apparatus capable of matching the video presentation timing with the sounding timing with high accuracy can be realized.

The nature, principle and utility of the invention will become more apparent from the following detailed description when read in conjunction with the accompanying drawings in which like parts are designated by like reference numerals or characters.

BRIEF DESCTIPTION OF THE DRAWINGS

DETAILED DESCRIPTION OF THE EMBODIMENT

An embodiment of the present invention is described below by referring to the attached drawings.

(1) Configuration Of Digital Broadcast Receiver

Figure 3:
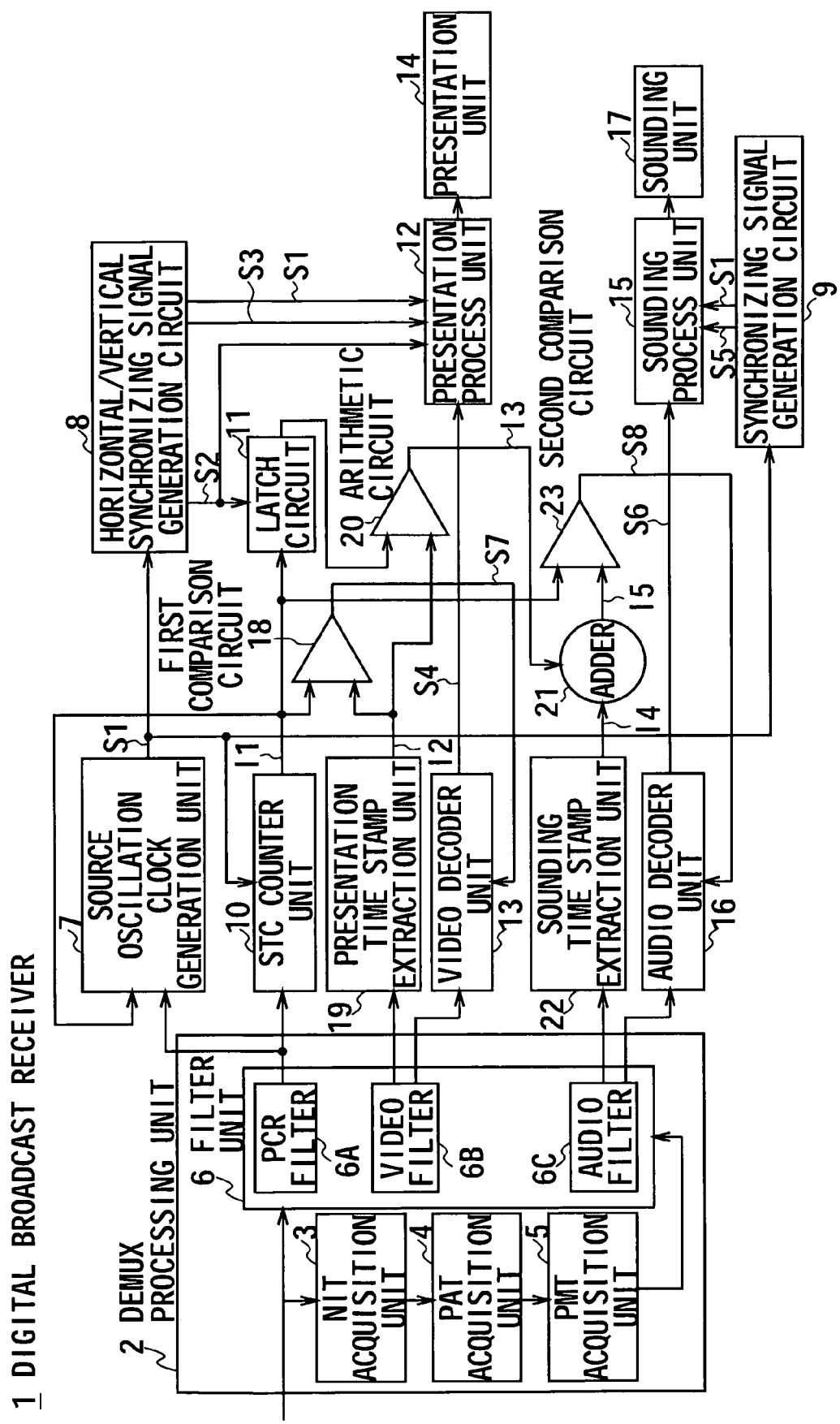
FIG. 3 is a block diagram showing the configuration of the digital broadcast receiver according to an embodiment of the present invention.

In a digital broadcast receiver 1 shown in FIG. 3, a NIT acquisition unit 3 in a DEMUX processing unit 2 receives an input stream from a television broadcast wave received through an antenna, etc.

The NIT acquisition unit 3 acquires a NIT (Network Information Table) from the received input stream. Thus, the digital broadcast receiver 1 can select a transponder corresponding to the request channel requested in the channel switching operation of a user according to the acquired NIT, and accordingly receives the transport stream corresponding to the request channel.

Then, a PAT acquisition unit 4 provided in the DEMUX processing unit 2 acquires a program association table (PAT). Next, a PMT acquisition unit 5 provided in the DEMUX processing unit 2 acquires a program map table (PMT) corresponding to the request channel requested in the channel switching operation of the user according to the PAT acquired by the PAT acquisition unit 4.

The PMT acquisition unit 5 recognizes a program identification (PID) corresponding to the request channel based on the acquired PMT, and sets the recognized PID in each of a PCR filter 6A, a video filter 6B, and an audio filter 6C in a filter unit 6.

Thus, the PCR filter 6A, the video filter 6B, and the audio filter 6C can respectively extract a PCR packet, a video packet, and an audio packet respectively containing the PCR data, the compressed video data, and the compressed audio data corresponding to the request channel from the received transport stream according to the respectively set PID.

A source oscillation clock generation unit 7 performs negative feedback control to make a signal output from an STC counter unit 10 be phase-synchronous with the PCR data in the PCR packet extracted from the PCR filter 6A as a reference signal. Thus, the source oscillation clock generation unit 7 can generate an operation clock signal S1 in synchronization with a reference clock signal at the encoding device, and provides the obtained operation clock signal S1 for a horizontal/vertical synchronizing signal generation circuit 8, a synchronizing signal generation circuit 9, and the STC counter unit 10.

The horizontal/vertical synchronizing signal generation circuit 8 generates a vertical synchronizing signal S2 for synchronization of the operation of a scanning line in the vertical direction and a horizontal synchronizing signal S3 for synchronization of the operation of a scanning line in the horizontal direction based on the operation clock signal S1 provided from the source oscillation clock generation unit 7. The horizontal/vertical synchronizing signal generation circuit 8 supplies the generated vertical synchronizing signal S2 for a latch circuit 11. The horizontal/vertical synchronizing signal generation circuit 8 provides the operation clock signal S1 provided from the source oscillation clock generation unit 7, and the generated vertical synchronizing signal S2 and horizontal synchronizing signal S3 for a presentation process unit 12.

Thus, the presentation process unit 12 provides a digital video signal S4 provided from a video decoder unit 13 for a presentation unit 14 at the subsequent stage according to the provided operation clock signal S1, vertical synchronizing signal S2, and horizontal synchronizing signal S3. As a result, the video based on the digital video signal S4 is presented on the presentation unit 14.

The synchronizing signal generation circuit 9 generates a synchronizing signal S5 for sounding according to the operation clock signal S1 provided from the source oscillation clock generation unit 7. The synchronizing signal generation circuit 9 provides the generated synchronizing signal S5 and the operation clock signal S1 provided from the source oscillation clock generation unit 7 for a sounding process unit 15. Thus, the sounding process unit 15 provides a digital audio signal S6 received from an audio decoder unit 16 for a sounding unit 17 at the subsequent stage according to the provided operation clock signal S1 and synchronizing signal S5. As a result, the audio according to the digital audio signal S6 is output through the sounding unit 17.

On the other hand, the STC counter unit 10 for keeping the system time clock (STC) in the digital broadcast receiver 1 according to the operation clock signal S1 from the source oscillation clock generation unit 7 sets the system time clock kept by the unit to the time clock indicated by the PCR data in the provided PCR packet when the PCR packet is provided from the PCR filter 6A. Thus, the system time clock kept in the digital broadcast receiver 1 can be synchronous with the time clock at the encoding device. Then, the STC counter unit 10 is configured to provide a system time clock stamp I1 indicating the kept system time clock for a latch circuit 11 and a first comparison circuit 18.

A presentation time stamp extraction unit 19 extracts a presentation time stamp (PTS) I2 associated with the compressed video data for each frame from the video packet extracted by the video filter 6B, and provides it for the first comparison circuit 18 and an arithmetic circuit 20.

The first comparison circuit 18 compares the system time clock stamp I1 sequentially provided from the STC counter unit 10 with the presentation time stamp I2 provided from the presentation time stamp extraction unit 19. For example, when the system time clock indicated by the system time clock stamp I1 matches the presentation time "pts (0)" indicated in the presentation time stamp I2, the first comparison circuit 18 provides a decoding process start directive signal S7 for starting the decoding process for the video decoder unit 13.

When the decoding process start directive signal S7 is provided from the first comparison circuit 18, the video decoder unit 13 generates the digital video signal S4 by performing the decoding process on one corresponding frame of compressed video data "Dpic (0)" obtained from the video packet extracted by the video filter 6B, and provides the signal for the presentation process unit 12.

Figure 4:
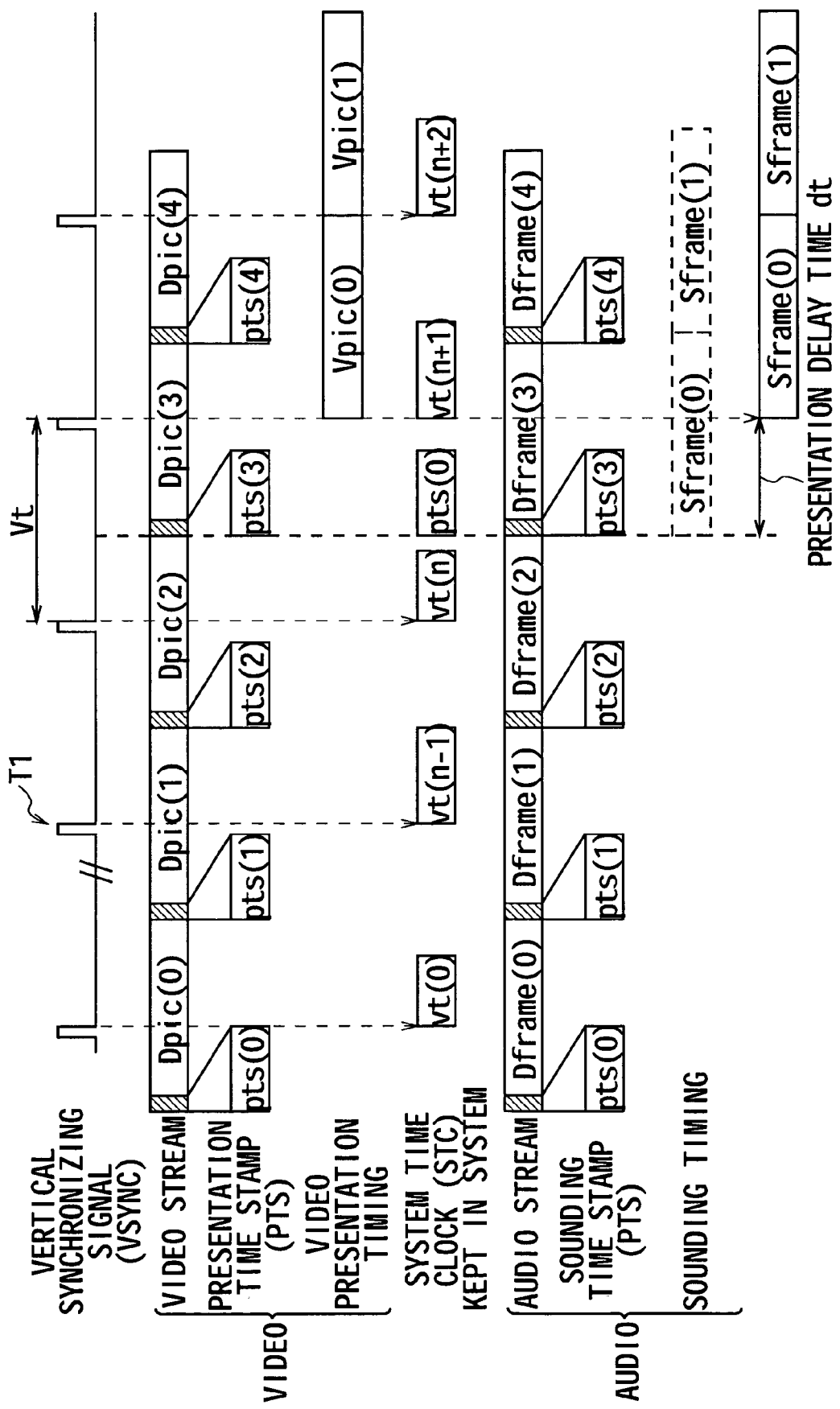
FIG. 4 is a time chart showing the video presentation timing and the sounding timing.

However, in this case, since the presentation process unit 12 has not received the vertical synchronizing signal S2 from the horizontal/vertical synchronizing signal generation circuit 8 at the system time clock "pts (0)" shown in FIG. 4, the presentation process unit 12 provides one frame of the digital video signal S4 received from the video decoder unit 13 for the presentation unit 14 at the time "vt(n+1)" when the S2 is provided. Thus, the timing indicating the video "Vpic (0)" based on the digital video signal S4 is delayed by a predetermined time dt after the presentation time "pts (0)" when the video "Vpic (0)" is to be presented (hereinafter the predetermined time dt is referred to as a presentation delay time).

The latch circuit 11 according to the present embodiment latches the system time clock stamp I1 indicating the system time clock "vt (n−1)" received from the STC counter unit 10 with, for example, the timing T1 when the vertical synchronizing signal S2 is provided in advance from the horizontal/vertical synchronizing signal generation circuit 8. Thus, the latch circuit 11 provides the arithmetic circuit 20 with the system time clock stamp I1 indicating the system time clock "vt(n−1)".

The arithmetic circuit 20 calculates the presentation delay time dt by performing the calculation by the following equation (1) when the presentation time stamp extraction unit 19 provides the presentation time stamp I2 indicating the presentation time "pts (0)".

$$dt = Vt - \{[pts(0) - vt(n-1)] \bmod Vt\} \quad (1)$$

The equation (1) above is practically explained as follows. That is, after subtracting the time "vt(n−1)" when the vertical synchronizing signal S2 is provided before from the presentation time "pts (0)" when the video "Vpic (0)" based on the compressed video data "Dpic (0)" is to be presented, the subtraction result is divided by the cycle time Vt of the vertical synchronizing signal S2. Then, the resultant remainder is subtracted from the cycle time Vt of the vertical synchronizing signal S2. Thus, the presentation delay time dt can be calculated.

The arithmetic circuit 20 provides an adder 21 with the presentation delay time stamp I3 indicating the obtained presentation delay time dt.

On the other hand, a sounding time stamp extraction unit 22 extracts a sounding time stamp (PTS) I4 associated with each frame of compressed audio data from the audio packet extracted by the audio filter 6C, and provides it for the adder 21.

Thus, the adder 21 adds the presentation delay time dt indicated by a presentation delay time stamp I3 provided from the arithmetic circuit 20 to, for example, the sounding time stamp "pts (0)" indicated by the sounding time stamp I4 provided from the sounding time stamp extraction unit 22, and provides an amended sounding time stamp I5 indicating the addition result "vt(n+1)" for a second comparison circuit 23.

The second comparison circuit 23 compares the system time clock stamp I1 sequentially provided from the STC counter unit 10 with the amended sounding time stamp I5 provided from the adder 21. Then, the second comparison circuit 23 provides a decoding process start directive signal S8 for starting the decoding process for the audio decoder unit 16 when the system time clock indicated in the system time clock stamp I1 matches the sounding time "vt(n+1)" indicated in the amended sounding time stamp I5.

When the decoding process start directive signal S8 is described from the second comparison circuit 23, the audio decoder unit 16 generates the digital audio signal S6 by performing the decoding process on a corresponding frame of compressed audio data "Dframe (0)" correspondingly obtained from an audio packet extracted by the audio filter 6C, and provides the signal for the sounding unit 17 through the sounding process unit 15. Thus, the audio "Sframe (0)" based on the compressed audio data "Dframe (0)" is output to the time "vt(n+1)" delayed by the presentation delay time dt after the time "pts (0)".

Thus, the digital broadcast receiver 1 can allow the video presentation timing with which the video "Vpic (0)" is presented to match with high accuracy the sounding timing with which the audio "Sframe (0)" corresponding to the video "Vpic (0)" is output.

Afterwards, the digital broadcast receiver 1 likewise continues adding the presentation delay time dt indicated by the presentation delay time stamp I3 provided from the arithmetic circuit 20 to the sounding time indicated by a sounding time stamp I4 provided from the sounding time stamp extraction unit 22. Thus, afterwards, the video presentation timing with which the video "Vpic (1)", . . . is presented can match with high accuracy the sounding timing with which the corresponding audio "Sframe (1)", . . . is output.

(2) Video/Audio Output Procedure

Figure 1:
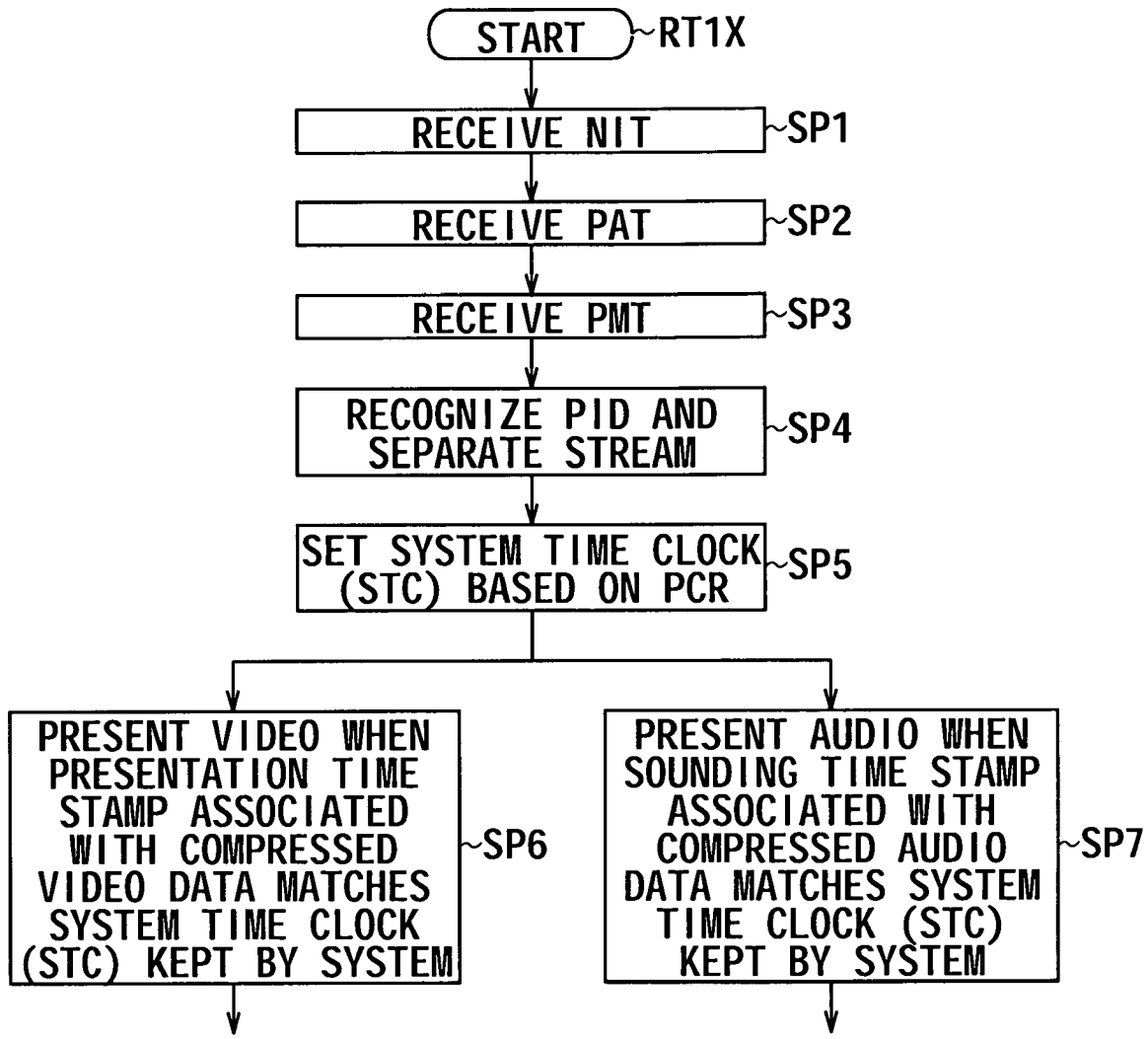
FIG. 1 is a flowchart of the video/audio output procedure in the past.
Figure 2:
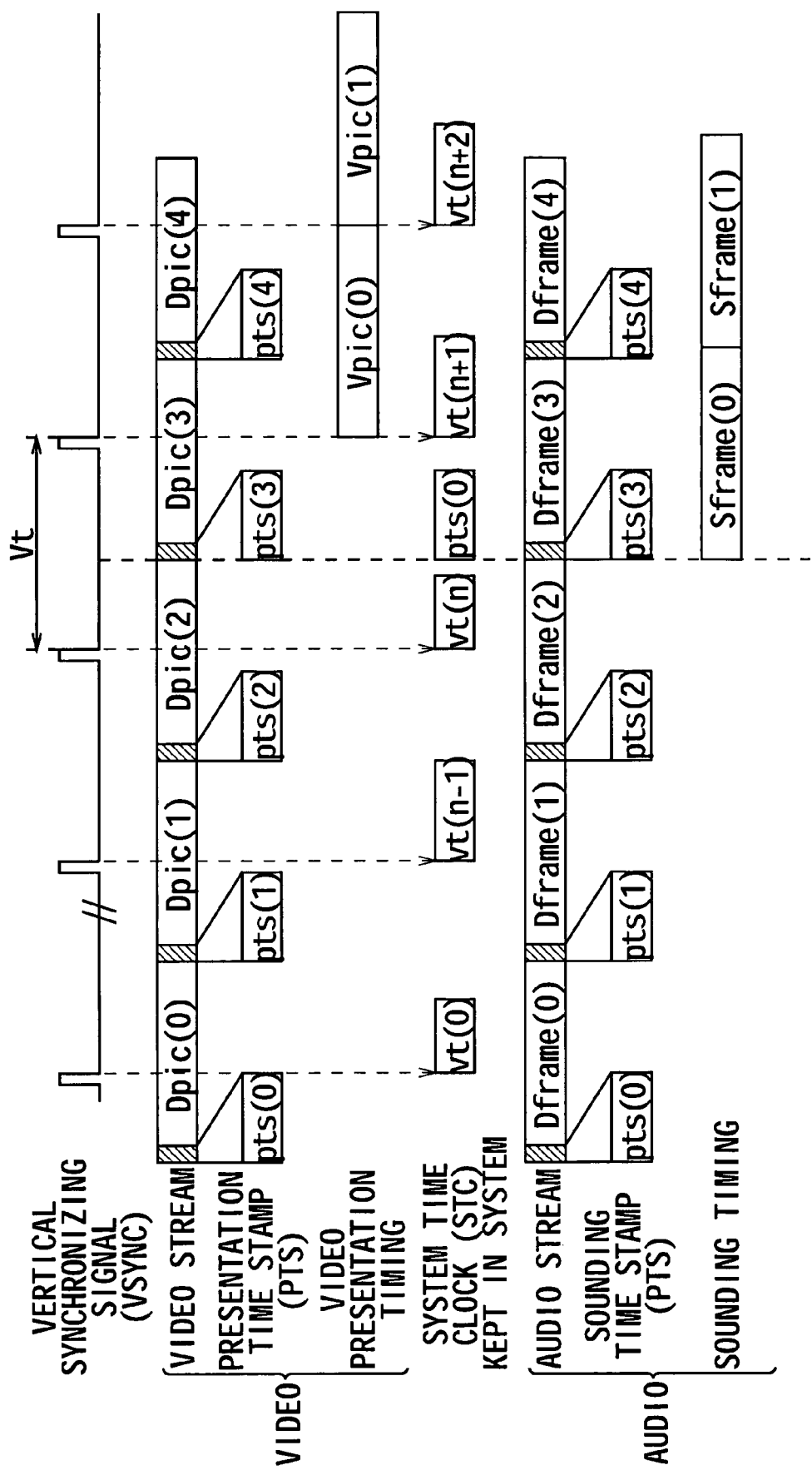
FIG. 2 is a time chart showing the video presentation timing and the sounding timing.
Figure 5:
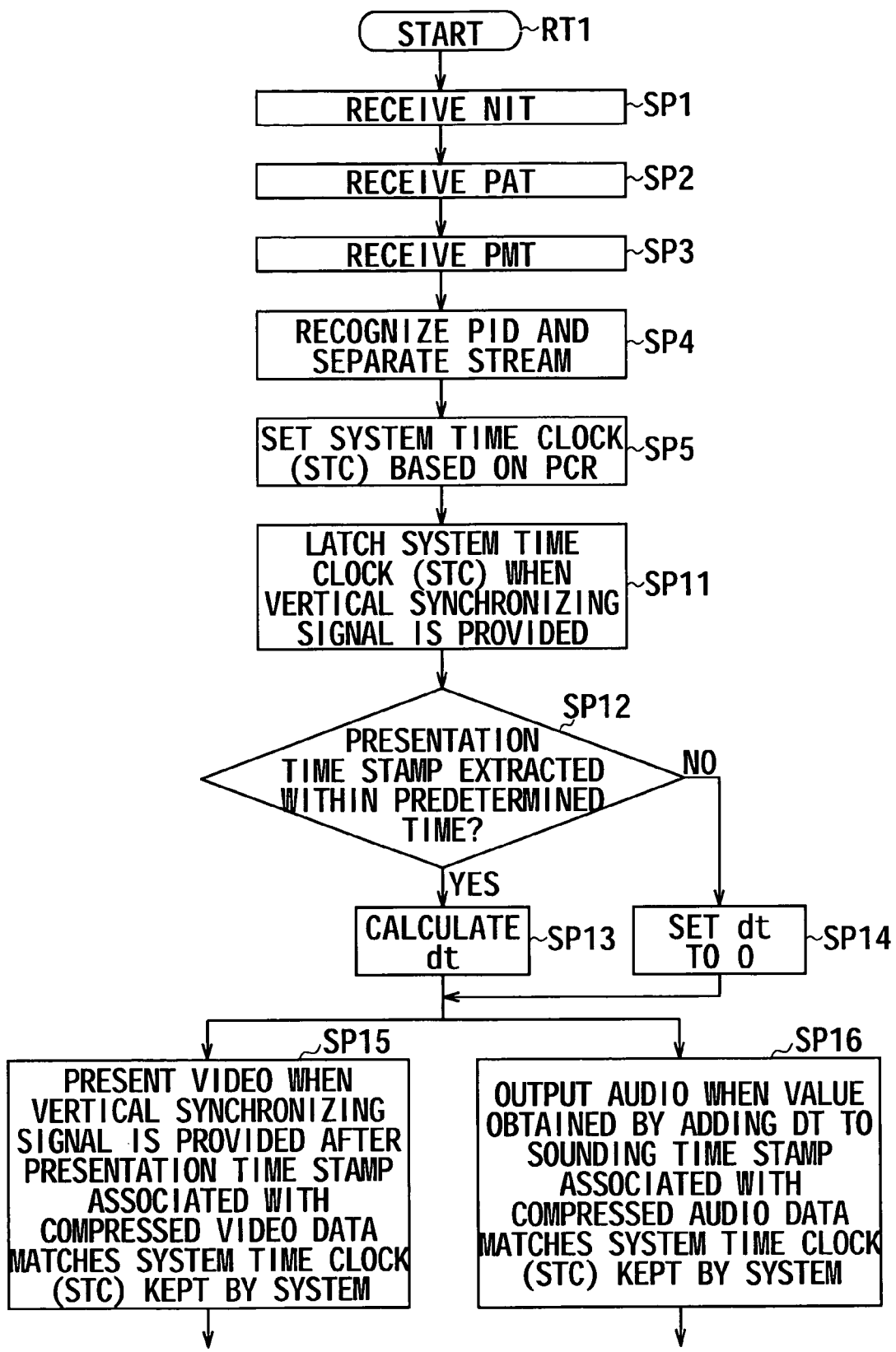
FIG. 5 is a flowchart of the video/audio output procedure.

The video/audio output procedure RT1 according to an embodiment of the present invention is described below by referring to FIG. 5 with the corresponding component shown in FIG. 1 assigned the same reference numeral.

As described above, the digital broadcast receiver 1 receives a NIT in step SP1, receives a PAT in step SP2, and receives a PMT in step SP3. Then, the digital broadcast receiver 1 separates a PCR packet, a video packet, and an audio packet from a transport stream using the PID recognized based on the PMT in step SP4. Then, the digital broadcast receiver 1 sets the system time clock kept by the STC counter unit 10 to the time clock indicated by the PCR data in the PCR packet in step SP5.

Then, in step SP11, the digital broadcast receiver 1 latches in the latch circuit 11 the system time clock stamp I1 ("vt(n−1)") provided from the STC counter unit 10 with, for example, the timing T1 (FIG. 4) of providing the vertical synchronizing signal S2.

Then, in step SP12, the digital broadcast receiver 1, determines whether or not the presentation time stamp I2 ("pts (0)") of the compressed video data "Dpic (0)" to be first decoded has been extracted by the presentation time stamp extraction unit 19 within a predetermined time.

If an affirmative result is obtained in step SP12, it means that the presentation time stamp I2 ("pts (0)") corresponding to the compressed video data "Dpic (0)" has been extracted. At this time, the digital broadcast receiver 1 passes control to the next step SP13.

In step SP13, the digital broadcast receiver 1 instructs the arithmetic circuit 20 to perform calculation by the equation (1) above according to the extracted presentation time stamp I2 ("pts (0)") and the system time clock stamp I1 ("vt (n−1)") latched by the latch circuit 11, thereby calculating the presentation delay time dt.

Thus, the digital broadcast receiver 1 can calculate in advance the presentation delay time dt of the video "Vpic (0)" to be presented in the next step SP15. Thus, the digital broadcast receiver 1 can delay the audio "Sframe (0)" corresponding to the video "Vpic (0)" by the presentation delay time dt before output in step SP16.

If a negative result is obtained in step SP12, it means that the presentation time stamp I2 ("pts (0)") has not been extracted because the presentation time stamp I2 ("pts (0)") corresponding to the compressed video data "Dpic (0)" has been lost, etc. At this time, the digital broadcast receiver 1 passes control to step SP14, not to step SP13 in which the presentation delay time dt is calculated. In step SP14, the digital broadcast receiver 1 sets the value of the presentation delay time dt to, for example, "0", and then control is passed to steps SP15 and SP16.

(3) Operation and Effect

With the above-mentioned configuration, the digital broadcast receiver 1 is configured to present on the presentation unit 14 the video "Vpic (0)" based on the compressed video data "Dpic (0)" when the horizontal/vertical synchronizing signal generation circuit 8 for providing the vertical synchronizing signal S2 on a predetermined cycle time Vt provides the vertical synchronizing signal S2 (time "vt(n+1)") after the presentation time "pts (0)" when the video "Vpic (0)" based on the compressed video data "Dpic (0)" is to be presented as shown in FIG. 4.

In the present embodiment, the digital broadcast receiver 1 calculates in advance the presentation delay time dt from the presentation time "pts (0)" when the video "Vpic (0)" based on the compressed video data "Dpic (0)" is to be presented to the time when the video "Vpic (0)" is practically presented on the presentation unit 14. The digital broadcast receiver 1 outputs the audio "Sframe (0)" based on the compressed audio data "Dframe (0)" when the calculated presentation delay time dt passes from the sounding time "pts (0)" when the audio "Sframe (0)" based on the compressed audio data "Dframe (0)" is to be outputted.

Thus, the digital broadcast receiver 1 can delay the output of the audio "Sframe (0)" by the delay of the presentation of the video "Vpic (0)", thereby successfully avoiding the shift between the video presentation timing with which the video "Vpic (0)" is presented and the sounding timing with which the audio "Sframe (0)" is output.

With the above-mentioned configuration, the presentation delay time dt from the presentation time when video based on the compressed video data is to be presented to the time when the video is presented on the presentation unit 14 is calculated, and the audio based on the compressed audio data is output when the calculated presentation delay time dt passes from the sounding time when the audio based on the compressed audio data is to be outputted, thereby possibly delaying the output of the audio by the delay of the presentation of the video. As a result, the shift between the video presentation timing with which the video is presented and the sounding timing with which the audio is output can be avoided. Accordingly, the digital broadcast receiver 1 capable of matching the video presentation timing with the sounding timing with high accuracy can be realized.

(4) Other Embodiments

In the above-mentioned embodiment, the latch circuit 11 is allowed to latch the system time clock stamp I1 ("vt(n−1)") with the timing T1 shown in FIG. 4. However, the present invention is not limited to this application, and the latch circuit 11 can latch the system time clock stamp I1 with another timing of providing the vertical synchronizing signal S2 from the horizontal/vertical synchronizing signal generation circuit 8 after the system time clock kept by the STC counter unit 10 is synchronized with the time of the encoding device and before the video based on the compressed video data is presented. Also in this case, the presentation delay time dt can be calculated by the equation (1) described above.

In the embodiment described above, the presentation process unit 12 and the presentation unit 14 are applied as presentation devices for presenting the video ("Vpic (0)", . . . ) based on the video data ("Dpic (0)", . . . ) when the providing device (8) for providing the video presentation timing signal (S2) indicating the timing with which video is presented at a predetermined cycle time (Vt) provides the video presentation timing signal (S2) after the presentation time ("pts (0)", . . . ) when the video ("Vpic (0)", . . . ) based on the video data ("Dpic (0)", . . . ) is to be presented. However, the present invention is not limited to this application, but various other configurations can also be applied.

Furthermore, in the above-mentioned embodiment, the arithmetic circuit 20 is applied as a calculation device for calculating the presentation delay time dt from the presentation time ("pts (0)", . . . ) when the video ("Vpic (0)", . . . ) based on the video data ("Dpic (0)", . . . ) is to be presented to the time when the video ("Vpic (0)", . . . ) is presented on the presentation device. However, the present invention is not limited to this application, but various other configurations can be applied so far as the calculation by the equation (1) described above is used.

Additionally, in the above-mentioned embodiment, the sounding process unit 15 and the sounding unit 17 are applied as sounding devices for outputting the audio ("Sframe (0)", . . . ) based on the audio data ("Dframe (0)", . . . ) when the calculated presentation delay time dt passes from the sounding time ("pts (0)", . . . ) when the audio ("Sframe (0)", . . . ) based on the audio data ("Dframe (0)", . . . ) is to be outputted. However, the present invention is not limited to the above-mentioned application, but various other configurations can be applied.

Furthermore, the above-mentioned embodiment performs as if it were hardware the process according to the present invention such as the video/audio output procedure RT1 using each circuit as shown in FIG. 3. However, the present invention is not limited to this application, but for example, a control unit such as the central processing unit CPU (CPU) according to the program stored in the storage unit such as a hard disk drive, etc. can perform as if it were software the process according to the present invention such as the video/audio output procedure RT1.

The present invention can be applied to a decoding device configured to output video and audio by decoding the compressed video data and compressed audio data encoded by the MPEG2 system.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus, comprising:
   a presentation device for presenting video based on video data when a video presentation timing signal is provided from a providing device for providing a video presentation timing signal indicating presentation timing for video at a predetermined cycle time after a presentation time when video based on video data is to be presented;
   a calculation device for calculating a presentation delay time from the presentation time when video based on the video data is to be presented to a time when the presentation device presents the video; and
   a sounding device for outputting audio based on audio data when the calculated presentation delay time passes from a sounding time when the audio based on the audio data is to be outputted,
   wherein the calculation device calculates the presentation delay time by subtracting a providing time when the video presentation timing signal is provided before the presentation time from the presentation time when the video based on the video data is to be presented, dividing a result of the subtraction by the cycle time of the video presentation timing signal, and subtracting a remainder obtained as a result of the division from the cycle time of the video presentation timing signal.

2. The data processing apparatus according to claim 1, wherein the video presentation timing signal is a vertical synchronizing signal.

3. A data processing method, comprising the steps of:
   presenting video based on video data when a video presentation timing signal is provided from a providing device for providing a video presentation timing signal indicating presentation timing for video at a predetermined cycle time after a presentation time when video based on video data is to be presented;
   calculating a presentation delay time from the presentation time when video based on the video data is to be presented to a time when the video is presented in the presenting step; and
   outputting audio based on audio data when the calculated presentation delay time passes from a sounding time when the audio based on the audio data is to be outputted,
   wherein the calculating step calculates the presentation delay time by subtracting a providing time when the video presentation timing signal is provided before the presentation time from the presentation time when the video based on the video data is to be presented, dividing a result of the subtraction by the cycle time of the video presentation timing signal, and subtracting a remainder obtained as a result of the division from the cycle time of the video presentation timing signal.

* * * * *

UNITED STATES PATENT AND TRADEMARK OFFICE
CERTIFICATE OF CORRECTION

| | | |
|---|---|---|
| PATENT NO. | : 7,600,240 B2 | Page 1 of 1 |
| APPLICATION NO. | : 11/274542 | |
| DATED | : October 6, 2009 | |
| INVENTOR(S) | : Katayama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Fifth Day of October, 2010

David J. Kappos
*Director of the United States Patent and Trademark Office*